United States Patent
Lin

(10) Patent No.: US 6,501,372 B2
(45) Date of Patent: Dec. 31, 2002

(54) TIRE CONDITION SENSOR COMMUNICATION WITH UNIQUE SAMPLING ON VEHICLE-SIDE DIVERSITY ANTENNA ARRAY

(75) Inventor: Xing Ping Lin, Waterford, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/776,547

(22) Filed: Feb. 2, 2001

(65) Prior Publication Data

US 2002/0105421 A1 Aug. 8, 2002

(51) Int. Cl.[7] .............................................. B60C 23/00
(52) U.S. Cl. ........................ 340/442; 340/445; 343/712
(58) Field of Search ................................. 343/711, 712, 343/876; 340/442, 445, 446, 447

(56) References Cited

U.S. PATENT DOCUMENTS

| | | | |
|---|---|---|---|
| 3,796,990 A | 3/1974 | Hill | |
| 3,836,970 A | 9/1974 | Reitzig | |
| 4,319,220 A | * 3/1982 | Pappas et al. | 340/58 |
| 4,536,668 A | * 8/1985 | Boyer | 310/75 R |
| 4,723,127 A | 2/1988 | Ohe et al. | |
| 5,463,374 A | * 10/1995 | Mendez et al. | 340/442 |
| 5,708,411 A | * 1/1998 | Hill | 340/447 |
| 5,774,047 A | * 6/1998 | Hensel | 340/442 |
| 5,889,826 A | 3/1999 | Takahashi | |

* cited by examiner

Primary Examiner—Tho Phan
(74) Attorney, Agent, or Firm—Tarolli, Sundheim, Covell, Tummino & Szabo L.L.P.

(57) ABSTRACT

A system (10) and associated method for tire condition communication for a vehicle (12). The system (10) includes a sensor (18), associated with a tire (14), to sense at least one tire condition. Transmitter components (22, 24 and 30), associated with the tire (14) and operatively connected to the sensor (18), provide for transmission of a signal (32) that has a data rate and that indicates the sensed tire condition. A receiver unit (40), associated with the vehicle (12), receives the signal (32). The receiver unit (40) includes a plurality of antennas (42A–42N), each for receiving the transmitted signal (32), and a switching device (46) among the plurality of antennas at a rate that is quicker than the data rate of the transmitted signal (32).

11 Claims, 3 Drawing Sheets

TIRE CONDITION SENSOR COMMUNICATION WITH UNIQUE SAMPLING ON VEHICLE-SIDE DIVERSITY ANTENNA ARRAY

TECHNICAL FIELD

The present invention relates to a tire condition monitoring system for providing tire operation parameter information, such as tire inflation pressure, to a vehicle operator. The present invention relates specifically to a tire condition monitoring system that utilizes a reception arrangement and process to eliminate lost data from a tire-mounted sensor unit during vehicle operation.

BACKGROUND OF THE INVENTION

Numerous tire condition monitoring systems have been developed in order to provide tire operation parameter information to a vehicle operator. One example type of a tire condition monitoring system is a tire pressure monitoring system that detects when inflation pressure within a tire drops below a predetermined threshold value.

There is an increasing need for the use of tire pressure monitoring systems due to the increasing use of "run-flat" tires for vehicles such as automobiles. A run-flat tire enables a vehicle to travel an extended distance after significant loss of air pressure within that tire. However, a vehicle operator may have difficulty recognizing the significant loss of air pressure within the tire because the loss of air pressure may cause little change in vehicle handling and little change in the visual appearance of the tire.

Typically, a tire pressure monitoring system includes a pressure sensing device, such as a pressure switch, in a unit at each tire and a communications link for conveyance of tire pressure information from the location of each tire to a central receiver unit. The central receiver unit is typically connected to an indicator (e.g., a display) located on a vehicle (e.g., on an instrument panel).

The communications link between each tire-based unit and the central receiver unit is often a wireless link. In particular, radio frequency signals are utilized to transmit information from each of the tire-based units to the central receiver unit.

Typically, tire condition monitoring systems have the ability to provide current tire condition information to a vehicle operator while the vehicle is in operation. For the systems that include tire-based units that are located within a pressurized cavity of a wheel/tire assembly, operation of the tire condition monitoring system entails operation of the tire-based units during rotation of the associated vehicle tires.

Turning to the radio frequency signals that are transmitted from the tire-based units to the central receiver unit, the signals typically comprise a series (e.g., a pulse string) of data bits. The time necessary to completely transmit a pulse string depends upon the number of bits to be transmitted, the type of transmission format (e.g., amplitude, shift key, or pulse-width modulation), carrier frequency, receiver sensitivity, etc. Typically, signal data rate is not very high. Commonly, the signal data rate is at a rate of a few kilohertz.

A typical transmission time for a message that has 54 bits would be about 18 milliseconds at a data rate of 3 kHz. For a vehicle that has 14-inch radius tires and that is traveling at relatively high rate of speed (e.g., 380 kilometers/hr.) each tire turns approximately 49 times/second. In other words, each turn of a tire takes 20 milliseconds. Thus, it can be easily seen that approximately one full rotation of a tire occurs during the complete transmission of the 18 milliseconds data string.

As a tire rotates, a direct path between a tire-based unit and a vehicle-based unit changes. As the direct path changes, the objects that are located along the direct path change. In one scenario, it is possible that a bulk of the associated metal wheel, suspension components, etc. is alternately in and out of the direct path. In general, the movement of the tire-based unit relative to the associated wheel and other components during tire rotation causes the transmitted signal to be subject to variation in polarization, multi-pass interference, fading, etc. These influences cause variation in the strength of the signal at the vehicle-based receiver.

Other factors can affect signal strength. For example, change in the environment surrounding the vehicle will cause variation in signal strength. One example of an environment change is a car or object that passes relatively near to the vehicle. In sum, it is possible that signal strength at the central receiver unit may become so weak during a portion of a pulse string that the central receiver is not able to receive that portion of the pulse string. Accordingly, the message is lost.

SUMMARY OF THE INVENTION

In accordance with one aspect, the present invention provides a tire condition communication system for a vehicle. Sensor means, associated with a tire, sense at least one tire condition. Transmitter means, associated with the tire and operatively connected to the sensor means, transmits a signal that has a data rate and that indicates the sensed tire condition. Receiver means, associated with the vehicle, receives the signal. The receiver means includes a plurality of antennas, each for receiving the transmitted signal, and means for switching among the plurality of antennas at a rate that is quicker than the data rate of the transmitted signal.

In accordance with another aspect, the present invention provides a tire condition communication system for a vehicle. A tire condition sensor and a transmitter unit is associated with a tire. A transmitted signal from the unit has a data rate and indicates a sensed tire condition. A receiver unit is associated with the vehicle. The receiver unit includes a plurality of transmitted signal receiving antennas. The receiver unit includes a plurality of switches, with each switch being interposed between a respective one of said antennas and another portion of the receiver unit. The receiver unit including a switch-controlling controller that controls the switches to sequentially connect one antenna at a time to the other portion of the receiver at a rate that is quicker than the data rate of the transmitted signal.

In accordance with another aspect, the present invention provides a tire condition communication method for a vehicle. At least one tire condition is sensed at a tire. A signal that indicates the sensed tire condition is transmitted from the tire. The transmitted signal has a data rate. The signal is received for use in determining the indication of the sensed tire condition. Switching among a plurality of antennas at a rate that is quicker than the data rate of the transmitted signal is utilized to receive the signal for use in determining the indication of the sensed tire condition.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
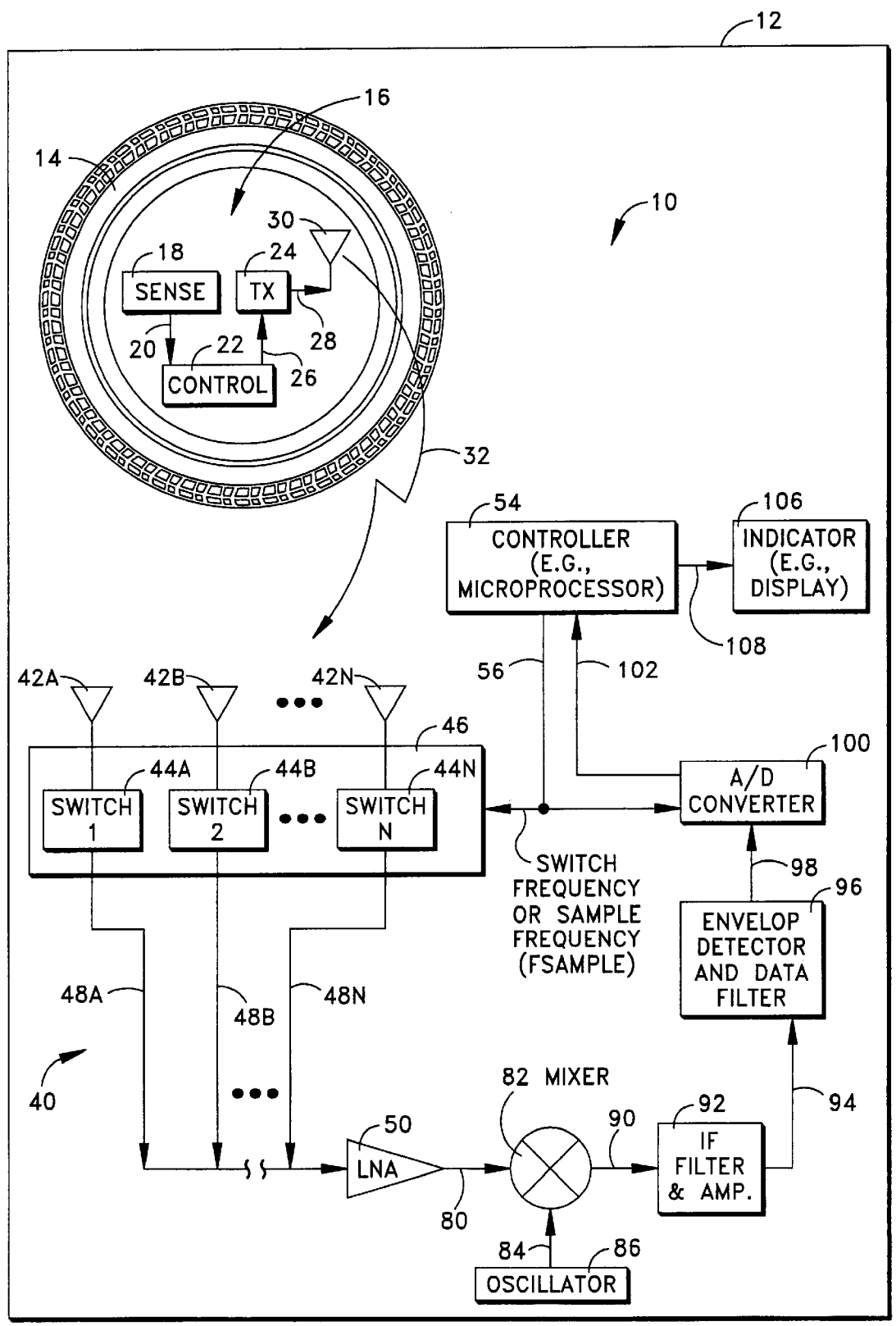
FIG. 1 is a schematic block diagram of a portion of a tire condition communication system in accordance with the present invention.

A tire condition communication system 10 in a vehicle 12 is schematically shown in FIG. 1. It is to be appreciated that the vehicle 12 has a plurality (e.g., four) of inflatable tires 14. In the illustration of FIG. 1, only a single tire 14 and associated structure is shown. It is to be appreciated that the vehicle 12 may have any number of tires 14, each with associated structure similar to the structure shown for the single tire.

Turning to the mentioned associated structures, the system includes a plurality of tire condition sensor units 16, each for sensing one or more tire conditions at a respective one of the vehicle tires 14. Generally, the number of tire condition sensor units 16 is equal to the number of tires 14 provided within the vehicle 12. In the illustrated example, only one tire condition sensor unit 16 is shown. It is to be appreciated that all of the tire condition sensor units 16 have similar structure and function. Only the single tire 14 with the single tire condition sensor unit 16 are shown and operation thereof discussed for brevity, but is to be understood that the provided discussion is generally applicable to the other tires and associated tire condition sensor units.

Generally, the tire condition sensor unit 16 is located at the respective tire 14. Accordingly, the tire condition sensor unit 16 is referred to as the tire-based unit 16.

The tire-based unit 16 includes one or more sensors 18 that are operatively connected 20 to a control portion 22. Each sensor 18 senses a tire condition and provides a signal indicative of the sensed tire condition to the control portion 22. It is to be noted that the sensed condition(s) may be any condition at the tire 14. For example, the sensed condition may be inflation pressure of the tire 14, temperature of the tire, motion of the tire, or even a diagnostic condition of the tire-based unit itself.

The control portion 22 has any suitable construction for processing the condition-indicative signal(s) and generating a message for conveyance of the sensed condition. The message typically also includes other conveyed information such as tire identification, error checking, parity, etc. Some of the information is retrieved from a memory storage component (e.g., a ROM) of the control portion 22. Accordingly, the control portion 22 includes hard-wired circuitry (e.g., an ASIC) and/or a microprocessor performing one or more routines, or the like.

The message is provided in the form a data string comprised of a plurality of pulses. In one example, the pulses are indicated by logic HIGH values and the absence of a pulse is indicated by logic LOW. It is to be noted that each logic HIGH and each logic LOW is a segment of the string that conveys the data. The format of the data string may be any suitable format (e.g., pulse-width modulation, amplitude shift keying, etc.). Radio frequency (RF) transmit circuitry 24 is operatively connected 26 to the control portion 22. In turn, the RF transmit circuitry 24 is operatively connected 28 to an antenna 30.

The control portion 22 provides the message to the RF transmit circuitry 24 in the form of a serial signal. In response to the provision of the message conveying signal from the control portion 22, the RF transmit circuitry 24 provides an electrical stimulus signal to the antenna 30 to excite the antenna into broadcasting (outputting) a transmission signal 32.

The RF transmit circuitry 24 may have any suitable structure to accomplish the provision of the stimulus signal to the antenna 30. For example, the RF transmit circuitry 24 may include a circuit that provides a carrier frequency. In response to the stimulus signal from the control portion 22, the output of the RF transmit circuitry 24 is a pulsed signal, in which the pulses are comprised of the oscillating carrier frequency. In response to the stimulus provided by the RF transmit circuitry 24, the antenna 30 outputs the transmitted signal 32 as an RF electromagnetic signal that conveys the generated message (i.e., conveys the indication of the sensed tire condition) and is intended to be received by a vehicle-based unit 40.

It is to be appreciated that there is a significant likelihood that the transmitted signal 32 may be subject to interference. For example, if the tire-based unit 16 is mounted within the pressurized space bounded by the tire 14, the tire-based unit rotates with the tire. Accordingly, relative to the vehicle 12, the tire-based unit 16 has a variable position. Further, the changing position of the tire-based unit 16 is associated with possibilities that components of the tire, the suspension system, etc. will cause varying interference against the transmitted signal 32. In sum, it is to be appreciated that exhaustive lists of potential interfering objects, effects, etc. are not included herein. It is merely to be appreciated that the potential for signal interference exists.

Turning the vehicle-based unit 40, the unit includes a plurality of reception antennas 42A–42N. Each antenna (e.g., 42A) outputs an electrical signal upon reception of a RF signal. The antennas 42A–42N are mounted at various, distributed locations on the vehicle 12 and/or the antennas have properties/characteristics that permit different reception abilities for each antenna. Each antenna (e.g., 42A) is capable of receiving the transmitted signal 32. The antennas 42A–42N thus provide a diversity feature.

It is to be appreciated that any number of antennas 42A–42N may be provided within the vehicle-based unit 40. In the illustrated example, a number N of antennas is illustrated. The number N is provided to indicate the variable number.

An output of each antenna (e.g., 42A) is connected to an associated switch (e.g., 44A) within a switching device 46. Accordingly, there are N switches 44A–44N within the switching device 46. Each switch (e.g., 44A) has any suitable structure that is operable to permit (i.e., switch ON) and block (i.e., switch OFF) passage of a signal output from the respective antenna (e.g., 42A). It is to be appreciated that other structures (e.g., selective energizing of power-driven antenna structure) that accomplish the function of antenna outputs being selectively provided may be used.

An output of each of the switches (e.g., 44A) is connected (e.g., 48A) to an input of a linear amplifier 50. Accordingly, all of the antennas 42A–42N are connected, in parallel via the associated switches 44A–44N, to the amplifier 50. The amplifier 50, of course, provides amplification to any signal that is provided to its input.

A controller 54 of the vehicle-based unit 40 performs several functions. The controller 54 includes any suitable circuitry and/or microprocessor performing one or more program algorithms to accomplish the functions. The controller 54 is operatively connected 56 to the switching device 46, and as one of its functions controls the switching device such that only one of the plurality of switches (e.g., 44A) is ON (signal passage permitted) at a given time. As a result of this control of the switching device 46, only one of the plurality of antennas (e.g., 42A) is operatively connected to the amplifier 50 and thus only one of the output signals from that specific antenna is handled (amplified) by the amplifier at a time.

The control of the switches 44A–44N is such that the switch rate is faster or quicker than the data rate of the transmitted signal 32. Specifically, the switch rate is such that each switch (e.g., 44A) is ON for at least a portion of the time of each segment of the data stream that is conveyed via the transmitted signal 32. For example, each of the plurality of switches (e.g., 44A) is ON for at least a portion of the time associated with each logic HIGH segment and each logic LOW segment. A clocking synchronization scheme is utilized in which the controller 54 is aware of the data rate of the transmitted signal 32 or is at least able to provide control sufficiently related to the data rate of the transmitted signal to accomplish the function of having each of the plurality of switches ON for at least a portion of the time associated with each logic HIGH segment and each logic LOW segment. A switch rate that cycles at a rate that is at least double the data rate would easily accomplish the function.

In one example, the switch rate is defined by the following equation:

$$F_{switch} = 2N * F_{data}$$

wherein:

$F_{switch}$=switch frequency;

N=number of antennas; and $F_{data}$=data rate frequency.

The relatively fast switch rate enables each antenna (e.g., 42A) to have an opportunity to provide an indication of a received portion of the transmitted signal 32 to the amplifier 50. Thus, the output of the amplifier 50 is comprised of segments that are sequentially provided by different antenna outputs. Recall that the transmitted signal 32 is a defined by a modulated carrier frequency. Thus, the amplifier output signal contains segments that are both modulated and at the carrier frequency for those antennas that have adequately received the transmitted signal.

It is to be appreciated that the transmitted signal 32, at a sufficient strength, may not be received at every antenna (e.g., 42N) because of interference. However, it is to be appreciated that the plurality of antennas 42A–42N are located, or otherwise provided with abilities such that the transmitted signal 32 is adequately received at one or more of the plurality of antennas (e.g., 42B).

Figure 2:
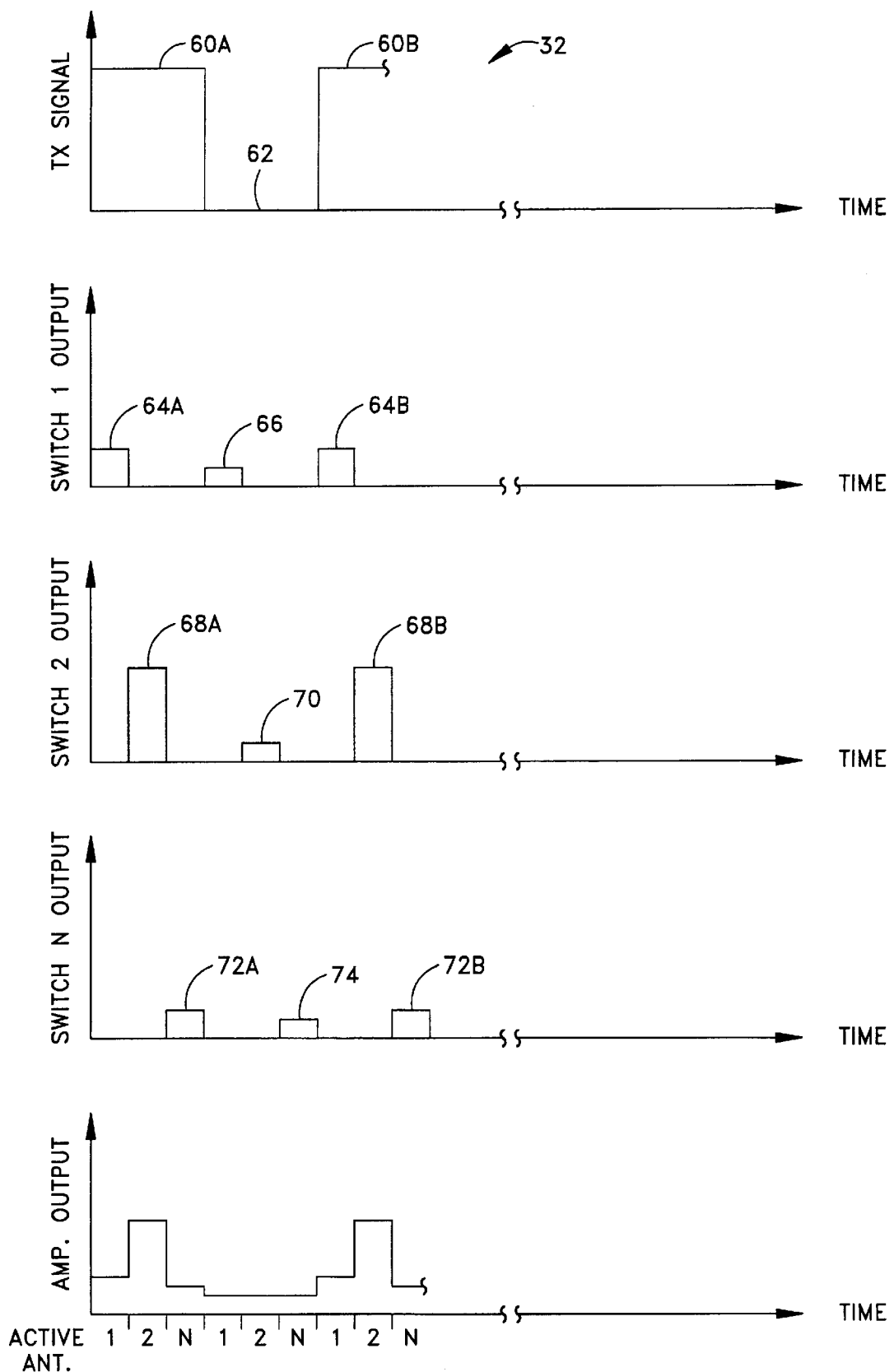
FIG. 2 is a group of time-related plots that indicate signal activity at various locations within the system shown in FIG. 1.

FIG. 2 provides a visual example of signal traces for several points in the drawing of FIG. 1. It is to be appreciated that the traces (FIG. 2) are not intended to be at-scale, but merely representative of possible amplitude levels of the carrier frequency. Also, it is to be appreciated that the traces, and in particular traces based upon switch outputs are greatly simplified and may not even represent a viable cycling pattern and/or switching frequency. For example, the traces are simplified to shown only one "ON" portion for each switch for each data segment, and overlap of ON portions and data segments transitions are avoided. Accordingly, the traces are intended to illustrate the inventive concept and may not truly represent an actual switch output.

Within FIG. 2, the first (top) trace is an indication of a few segments (logic HIGH segments 60A, 60B and logic LOW segments 62) of the transmitted signal 32. It is to be noted that at least one logic HIGH segment (60A and 60B) and at least one logic LOW segment 62 are shown. Specifically, the logic HIGH segment is represented by the higher (stepped-up) level of the trace and the logic LOW segment is represented by the lower (stepped-down) level. Again recall that in the discussed example, the logic HIGH segment is provided by the presence of the carrier frequency and that the logic LOW segment is provided by the absence of the carrier frequency.

The outputs of the plurality of switches 44A–44N are also shown within FIG. 2. It is to be recalled that each of the plurality of switches 44A–44N is individually turned ON at a very high rate. Thus, for each segment of the transmitted signal (e.g., the logic HIGH segment 60A or 60B, or the logic LOW segment 62), each of the antennas is ON for at least a portion of that time duration. In one example, which would produce the traces shown in FIG. 2, the switches are ON in a sequence from the first switch to $N^{th}$ switch.

Focusing on the output (second trace from the top in FIG. 2) of the first switch 44A, it can be seen that the first switch passes a certain level output signal (64A or 64B) from the first antenna 42A during the logic HIGH segment (60A or 60B) of the transmitted signal 32. The first switch 44A also passes a certain level output signal 66 from the first antenna 42A during the logic LOW segment 62 of the transmitted signal 32. However, it should be noted that there is minimal distinction between the amplitudes of the signals 64A, 64B and 66 that occur for the logic HIGH and the logic LOW segments, respectively. Accordingly, it can be assumed that the transmitted signal 32 has been interfered with as the transmitted signal proceeds toward the first antenna 42A. Further, it is possible that the amplitude difference as perceived at the first antenna 42A would be insufficient to distinguish logic HIGH and logic LOW.

Turning to the output (the trace third from top in FIG. 2) of the second switch 44B, it can be seen that the second switch passes a certain level output signal (68A or 68B) from the second antenna 42B during the logic HIGH segment (60A or 60B) of the transmitted signal 32. The amplitude of the output signal (68A or 68B) during the logic HIGH segment (60A or 60B) is relatively large. The second switch 44B also passes a certain level output signal 70 from the second antenna 42B during the logic LOW segment 62 of the transmitted signal 32. The amplitude of the output signal 70 during the logic LOW segment 62 is relatively small. Thus, the distinction in amplitude is sufficiently great to permit discerning the difference between logic HIGH and logic LOW.

Turning to the output (the trace second from bottom in FIG. 2) of the $N^{th}$ switch 44N, it can be seen that the $N^{th}$ switch passes a certain level output signal (72A and 72B) from the $N^{th}$ antenna during the logic HIGH segment (60A or 60B) of the transmitted signal 32. The $N^{th}$ switch 44N also passes a certain level output signal 74 from the $N^{th}$ antenna 42N during the logic LOW segment 62 of the transmitted signal 32. However, it should be noted that there is minimal distinction between the signal amplitude that occurs for the logic HIGH segment and the logic LOW segment. Accordingly, it can be assumed that the transmitted signal 32 has been interfered with as the transmitted signal proceeds toward the $N^{th}$ antenna 42N. Further, it is possible that the amplitude difference as perceived at the $N^{th}$ antenna 42N would be insufficient to distinguish logic HIGH and logic LOW.

Turning to the output (the last trace of FIG. 2) of the amplifier 50, combining the outputs of the plurality of switches 44A–44N provides a stepped series of levels. However, it is be appreciated that at least one (e.g., from the second switch 44B associated with second antenna 42B) of the antenna outputs has provided an indication that accurately represents the digital data found within the transmitted signal 32.

Turning back FIG. 1 and the example structure illustrated therein, the output of the amplifier is operatively connected 80 to a first input of a mixer 82. A second input of the mixer 82 is operatively connected 84 to an oscillator 86. The mixer 82 combines the output of the amplifier 50 and the oscillator 86 to generate an output signal with oscillating segments that are at an intermediate or base band frequency. It is to be appreciated that the intermediate frequency (IF) signal output by the mixer 82 is still indicative of the segments (all or at least part) of the digital data portions that are received at the plurality of antennas 42A–42N. Thus, the output of the mixer 82 is indicative of the transmitted signal 32. However, the intermediate frequency provided by the mixer 82 output is more easily processed.

The output of the mixer 82 is operatively connected 90 to an IF filter and amplifier 92. In turn, the output of the IF filter and amplifier 92 is operatively connected 94 to an envelope detector and data filter component 96. The envelope detector and data filter component 96 provide means to identify the digital data as represented by at least one of the antenna outputs (e.g., from the second antenna 42B).

The implementation to discern logic HIGH or logic LOW need not have a specific configuration, and may be by any of various methods. One method would be purely identifying clearly large amplitude signals as representing a logic HIGH for a segment of the data stream. Another method would include averaging all of the received signals from the plurality of antennas for each segment to discern an indication of logic HIGH or logic LOW. The use of an averaging technique may be simpler and cheaper, but may have a drawback in that a few decibels of sensitivity may be lost. In one example, the distinction between logic HIGH and logic LOW is based upon a comparison of a signal level to a noise floor. Along these lines and returning briefly to FIG. 2, the antenna outputs that are associated with the time for logic LOW may be indicating noise. In sum, the digital data is discerned despite the fact that one or more of the plurality of antennas were unable to output signals that are clearly indicative of the digital data of the transmitted signal.

An output of the envelope detector and data filter component 96 is operatively connected 98 to an analog-to-digital (A/D) converter 100. Specifically, it is to be appreciated that up to the A/D converter 100 within the vehicle-based unit 40 data bits are provided via pulses at a frequency (e.g., a carrier frequency or the intermediate frequency represent the digital data). It should also be noted that the A/D converter 100 is operatively connected 56 to receive control information from the controller 54 in a same manner as with the switching device 46. This aids synchronization of operation of the system 10 to properly identify logic HIGH and logic LOW that are used to convey the data bits.

With the data converted to digital form, the information contained therein can be discerned. Specifically, the output of the A/D converter is operatively connected 102 to the controller 54. In a function performed by the controller 54, the conveyed information (e.g., message, ID, etc.) is discerned. It should be appreciated that along with discerning the conveyed information, the controller performs various processes on the conveyed information. For example, the message is checked for errors (e.g., parity and error checking), the identity (e.g., left-front, left-rear, right-front, right-rear) of the transmitting tire is verified, and the conveyed message is handled. An indicator 106 (e.g., a display unit located on a vehicle dashboard) is operatively connected 108 to the controller 54. With regard to handling the conveyed message, the controller 54 generates one or more indication signals to convey tire condition information and associated tire identity to the indicator 106. Thus, information (e.g., the tire condition and the associated tire identity) is provided for the vehicle operator.

Figure 3:
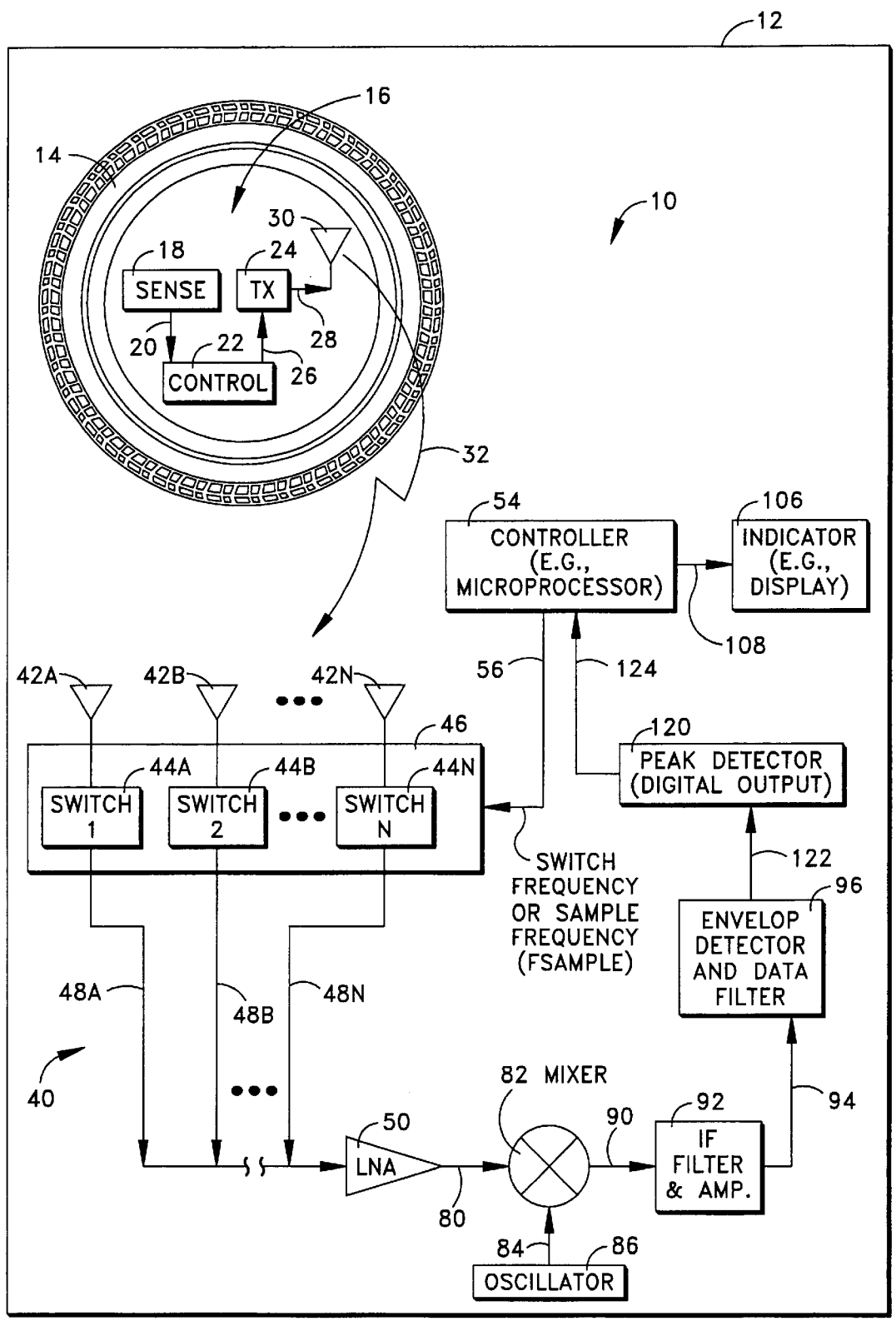
FIG. 3 is a schematic block diagram of a second embodiment of a tire condition communication system in accordance with the present invention.

Turning to FIG. 3, another embodiment of a system is shown. In general, the second embodiment is very similar to the first embodiment. Accordingly, structure that is identical for the first and second embodiments is identified by the same reference numerals. The second embodiment differs from the first embodiment in that a peak detector 120 is utilized instead of the A/D converter 100. Specifically, the peak detector 120 is operatively connected 122 to receive the output of the envelope detector and data filter component 96. The peak detector 120 is also operatively connected 124 to the controller 54. The peak detector is constructed to have sufficient speed to track the peak or average signal for the relatively fast antenna switch cycles. Thus, the peak detector can discern logic HIGH and logic LOW for the transmitted signal portions and outputs a digital signal for the controller accordingly.

From the above description of the invention, those skilled in the art will perceive improvements, changes and modifications. Such improvements, changes and modifications within the skill of the art are intended to be covered by the appended claims.

Having described the invention, the following is claimed:

1. A tire condition communication system for a vehicle, said system comprising:
   sensor means, associated with a tire, for sensing at least one tire condition;
   transmitter means, associated with the tire and operatively connected to said sensor means, for transmitting a signal that has a data rate and that indicates the sensed tire condition; and
   receiver means, associated with the vehicle, for receiving the signal, said receiver means including a plurality of antennas, each for receiving the transmitted signal, and means for switching among the plurality of antennas at a rate that is quicker than the data rate of the transmitted signal.

2. A system as set forth in claim 1, wherein each of said antennas outputs a signal within a time length of a data segment, said receiver means includes means for utilizing signals output by said plurality of antennas to determine a value of the associated data segment.

3. A system as set forth in claim 1, wherein said means for switching includes a plurality of switches, each switch is operatively connected to a respective one of said antennas.

4. A system as set forth in claim 3, wherein said receiver means includes means for controlling said plurality of switches such that only a single switch is on at a time.

5. A system as set forth in claim 1, wherein said receiver means includes means for processing the antenna output signals in succession.

6. A system as set forth in claim 1, wherein said receiver means includes means for utilizing the processed antennas outputs signals to discern the data of the transmitted signal.

7. A system as set forth in claim 6, wherein the data is comprised of a series of logic level segments, said means for utilizing the processed antennas outputs signals to discern the data includes means for utilizing less that all of the processed antenna outputs to discern a logic level at each segment.

8. A tire condition communication system for a vehicle, said system comprising:

a tire condition sensor and a transmitter unit associated with a tire, a transmitted signal from said unit has a data rate and indicates a sensed tire condition; and a receiver unit associated with the vehicle, said receiver unit includes a plurality of transmitted signal receiving antennas, said receiver unit includes a plurality of switches, with each switch being interposed between a respective one of said antennas and another portion of said receiver unit, and said receiver unit including a switch-controlling controller that controls said switches to sequentially connect one antenna at a time to said other portion of said receiver at a rate that is quicker than the data rate of the transmitted signal.

9. A tire condition communication method for a vehicle, said method comprising the steps of:

sensing at least one tire condition at a tire;

transmitting a signal, from the tire, that indicates the sensed tire condition, the transmitted signal has a data rate; and receiving the signal for use in determining the indication of the sensed tire condition, including switching among a plurality of antennas at a rate that is quicker than the data rate of the transmitted signal.

10. A method as set forth in claim 9, wherein the step of switching among the plurality of antennas includes the step of switching such that each of the antennas outputs a signal within a time length of a data segment, and the method also including the step of utilizing the plurality of output signals to determine a value of the associated data segment.

11. A method as set forth in claim 9, wherein the step of switching among the plurality of antennas includes controlling a plurality of switches, each switch being operatively connected to a respective one of the antennas.

* * * * *